United States Patent
Derrick et al.

[11] Patent Number: 5,872,980
[45] Date of Patent: Feb. 16, 1999

[54] SEMAPHORE ACCESS CONTROL BUFFER AND METHOD FOR ACCELERATED SEMAPHORE OPERATIONS

[75] Inventors: John E. Derrick, Milton, Vt.; Christopher M. Herring, Longmont, Colo.

[73] Assignee: International Business Machines Corporation, Armonk, N.Y.

[21] Appl. No.: 591,290

[22] Filed: Jan. 25, 1996

[51] Int. Cl.[6] .................................................. G06F 13/00
[52] U.S. Cl. .......................... 395/726; 395/299; 395/308; 395/309
[58] Field of Search ..................... 395/726, 299, 395/725, 595, 308, 309, 617, 681; 364/200; 330/51; 365/230.08

[56] References Cited

U.S. PATENT DOCUMENTS

| | | | |
|---|---|---|---|
| 4,393,459 | 7/1983 | Huntley et al. | 364/900 |
| 4,589,092 | 5/1986 | Matick | 364/900 |
| 4,725,946 | 2/1988 | Prange et al. | 364/200 |
| 4,928,222 | 5/1990 | Vriezen et al. | 364/200 |
| 4,949,239 | 8/1990 | Gillett, Jr. et al. | 364/200 |
| 4,965,718 | 10/1990 | George et al. | 364/200 |
| 4,977,498 | 12/1990 | Rastegar et al. | 364/200 |
| 5,050,072 | 9/1991 | Earnshaw et al. | 364/200 |
| 5,081,702 | 1/1992 | Hamden | 395/725 |
| 5,115,499 | 5/1992 | Stiffler et al. | 395/425 |
| 5,175,837 | 12/1992 | Arnold et al. | 395/425 |
| 5,249,286 | 9/1993 | Alpert et al. | 395/425 |
| 5,261,106 | 11/1993 | Lentz et al. | 395/725 |
| 5,263,161 | 11/1993 | Barth et al. | 395/650 |
| 5,276,847 | 1/1994 | Kohn | 395/425 |
| 5,276,886 | 1/1994 | Dror | 395/725 |
| 5,293,491 | 3/1994 | Leung et al. | 395/275 |
| 5,339,443 | 8/1994 | Lockwood | 395/725 |
| 5,341,491 | 8/1994 | Ramanujan | 395/425 |
| 5,392,433 | 2/1995 | Hammersley et al. | 395/725 |
| 5,440,746 | 8/1995 | Lentz | 395/163 |
| 5,574,922 | 11/1996 | James | 395/561 |
| 5,594,880 | 1/1997 | Moyer et al. | 395/595 |
| 5,615,167 | 3/1997 | Jain et al. | 365/230.08 |
| 5,652,885 | 7/1997 | Reed et al. | 395/561 |
| 5,721,871 | 2/1998 | Ginsberg et al. | 395/479 |

*Primary Examiner*—Meng-Ai T. An
*Assistant Examiner*—Eric S. Thlang
*Attorney, Agent, or Firm*—Schmeiser, Olsen & Watts; Eugene I. Shkurko

[57] ABSTRACT

A spin buffer and associated method assure data integrity in shared resources in a computer system. Concurrent accesses to different semaphores by different devices are allowed. Lock and identification data within the semaphore is cached in the spin buffer so a device requesting access to a shared resource that corresponds to a semaphore that is represented in the spin buffer may determine whether any other device has ownership of the shared resource by accessing the data within the spin buffer, rather than reading from the semaphore. By caching semaphore lock information and allowing concurrent accesses to different semaphores by different devices, enhances system performance is achieved.

5 Claims, 7 Drawing Sheets

SEMAPHORE ACCESS CONTROL BUFFER AND METHOD FOR ACCELERATED SEMAPHORE OPERATIONS

BACKGROUND OF THE INVENTION

1. Technical Field

This invention generally relates to data processing systems, and more specifically relates to a spin buffer and method for using the spin buffer to control accesses to semaphores in a computer system to assure data integrity of shared resources while increasing system performance.

2. Background Art

The development of the EDVAC computer system of 1948 is often cited as the beginning of the computer era. Since that time, computer systems have evolved into extremely sophisticated devices. However, even today's most sophisticated computer systems continue to include many of the basic elements that were present in some of the first computer systems. For example, most modern computer systems include a processor, memory, and one or more peripheral devices. In recent times, multiple processors have been introduced to enhance the computational speed of computer systems. A computer system with multiple processors typically shares memory and peripherals among the processors, rather than having separate memory and peripherals for each processor. In order to maintain the integrity of data within the computer system, a mechanism must be provided for assuring the data needed by one processor is not corrupted by another processor.

One method for assuring data integrity in computer systems with shared resources uses special signaling constructs known as semaphores. Semaphores in computer systems are typically memory locations that contain information relating to the status of shared resources. In the most common case, a separate semaphore is assigned to each shared resource. When a device (such as a processor or a peripheral) needs access to a shared resource, it first accesses the semaphore that corresponds to the shared resource to find out if the shared resource is available. If the semaphore indicates that the shared resource is available, the requesting device changes the semaphore to indicate that the shared resource is now busy, and then accesses the shared resource. This sequence is commonly known as an atomic read-modify-write cycle. When the device has completed its interaction with the shared resource, it writes data to the semaphore to indicate that the shared resource is now available for other devices to use. When a device first accesses a semaphore to determine whether the corresponding shared resource is available, if the semaphore indicates that the resource is busy (i.e., not available), the requesting device must read from the semaphore at a later time to determine whether or not the shared resource is still busy. This process of re-reading the semaphore is known as "spinning", and is typically repeated until access to the shared resource is achieved. The steps outlined above describe the theory of using semaphores to share resources in a computer system.

While the theory as described above of using semaphores is relatively simple and straightforward, the details of its implementation pose significant challenges. For example, it is possible for a first device to read from a semaphore and determine that the shared resource is available, and yet before the first device can write data to the semaphore to indicate the shared resource is no longer available, a second device could read the semaphore, which still indicates that the shared resource is available. The first device would then perform a write to the semaphore to make the shared resource unavailable, and the second device would then follow with a similar write. The result is that both the first and the second devices would believe they have exclusive access to the shared resource, which violates the integrity of the data in the shared resource and frustrates the very purpose of providing the semaphore. Thus, a method is required for locking out accesses by a device to a semaphore during the atomic read-modify-write cycle to that semaphore by another device.

One known method for resolving this problem is to block out all accesses to all semaphores until the atomic read-modify-write cycle is complete. While this approach solves the problem identified above, it does so at the expense of prohibiting all semaphore accesses until the requesting device has completed the atomic read-modify-write cycle, rather than prohibiting only accesses to the same semaphore. For the sake of simple circuit design, this brute force approach of locking out all semaphore accesses during the atomic read-modify-write cycle has become common and accepted. This approach, however, reduces system throughput by inhibiting accesses to different semaphores during the atomic read-modify-write cycle, as described below.

Referring to FIG. 1, a prior art method 100 uses semaphores to assure data integrity when multiple devices share common resources. When a device needs a shared resource (step 102), the device locks out all semaphore accesses by other devices (step 104). The device then reads the semaphore (step 106) to determine if the shared resource is available, i.e., if the shared resource is owned by another master (step 108). If the semaphore indicates that the shared resource is owned by another master, it must "spin", which means that the device must retry to gain access of the shared resource at a later time. Notice that the accesses to semaphores must be unlocked (step 110) to allow other devices to perform semaphore operations (and even to allow the device that currently owns the desired shared resource to relinquish ownership by writing to the semaphore).

If the semaphore indicates that the shared resource is not owned by another master, the device writes to the semaphore (step 112) to indicate to other devices that it owns the shared resource. Once the device has written to the semaphore (step 112), it has acquired ownership of the shared resource (step 114). The device may then unlock semaphore accesses (step 116) to allow other devices to perform semaphore accesses.

While the prior art method 100 of controlling ownership of shared resources through semaphores avoids the problem of two devices obtaining simultaneous control of a resource, it does so at the expense of locking out all semaphore accesses (step 104) until semaphore accesses are unlocked (step 116) after it has obtained ownership of the resource (step 114).

Therefore, there existed a need to selectively disable accesses to a semaphore that is currently being accessed by one bus master while allowing accesses to all other semaphores. This method of resource allocation enhances throughput by allowing different masters to access different semaphores simultaneously.

DISCLOSURE OF INVENTION

According to the present invention, a spin buffer is provided which allows for locking out accesses to each semaphore independently of accesses to other semaphores. The spin buffer contains memory locations which indicate whether a requested shared resource is owned by another device. For example, the memory locations within the spin buffer may contain the address of the corresponding semaphore, and contain information regarding the ownership of the shared resource corresponding to the semaphore. The spin buffer thus provides caching of information within the semaphore relating to the ownership status of the shared resource. While one device checks to see if a shared resource is available, other devices may access data in the spin buffer to see if other shared resources are available without directly accessing the semaphore. The spin buffer and associated method guarantee exclusive access to semaphores using a fully-associative memory structure.

The foregoing and other objects, features and advantages of the invention will be apparent from the following more particular description of preferred embodiments of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

Figure 1:
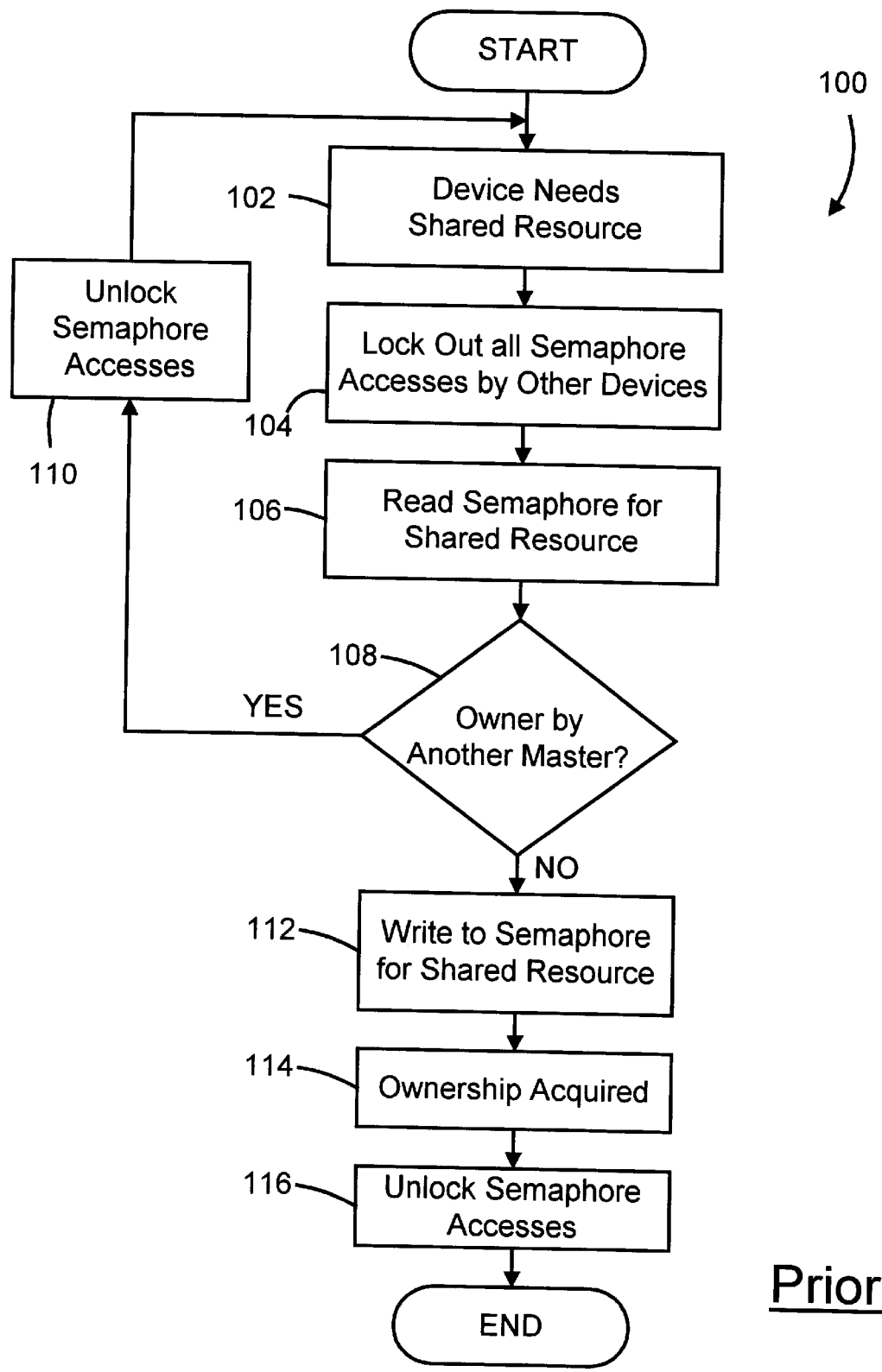
FIG. 1 is a flow diagram of a prior art method for using semaphores to assure data integrity of shared resources.
Figure 2:
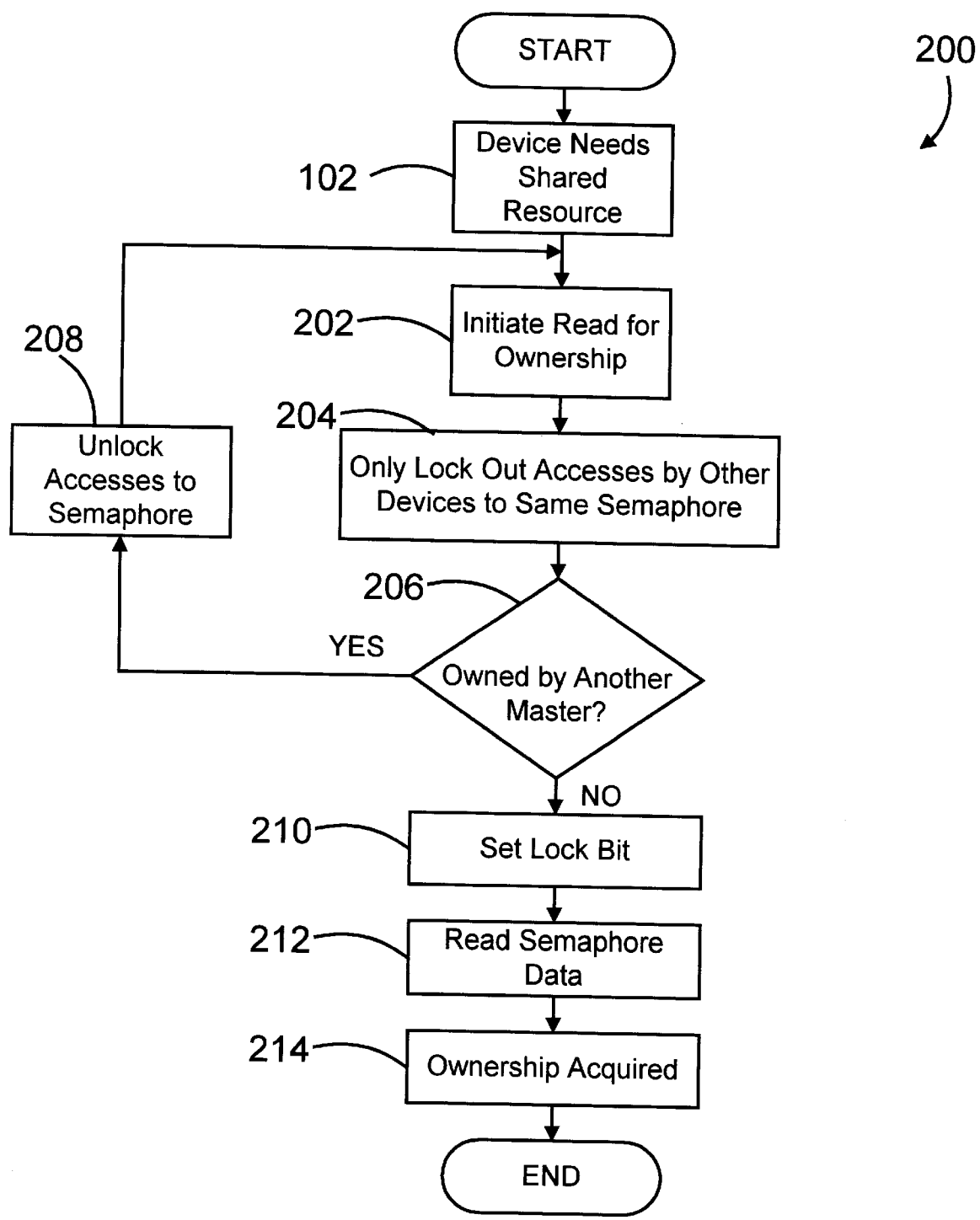
FIG. 2 is a flow diagram of a method for acquiring ownership of a semaphore in accordance with the present invention.

Referring to FIG. 2, a method 200 for assuring data integrity of shared resources allows concurrent access to different semaphores by different devices, rather than locking out all semaphore accesses when one device is accessing a semaphore. When a device needs a shared resource (step 102), it initiates a read to establish ownership of that resource (step 202). While reading for ownership (step 202), the device only locks out accesses by other devices to that same semaphore (step 204). This allows other devices to access other semaphores (and thereby acquire ownership of other shared resources) while the requesting device is acquiring ownership of the requested shared resource. The requesting device then checks to see if the shared resource it is requesting is already owned by another device (step 206). If the shared resource is owned by another device, the device must spin and try to gain ownership of the shared resource at a later time. If the device must spin, it unlocks accesses to the semaphore (step 208) so that other devices may access the semaphore.

If the requested shared resource is not owned by another master, the requesting device acquires ownership by setting a lock bit (step 210), which indicates to other devices that the requesting device owns the shared resource. The device can then read the data from the semaphore (step 212), which completes the process for acquiring ownership (step 214) of the shared resource.

Figure 3:
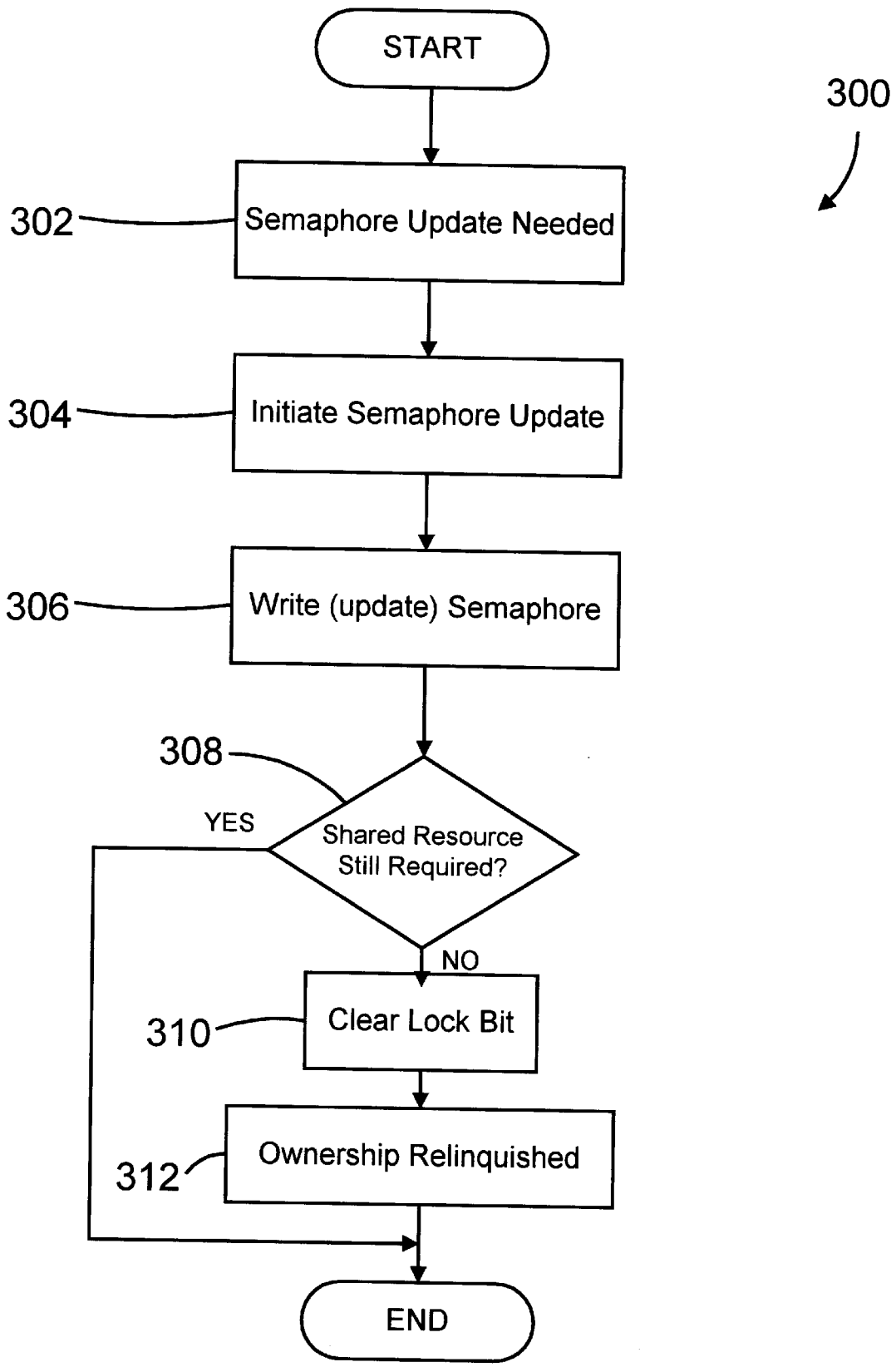
FIG. 3 is a flow diagram of a method for updating a semaphore in accordance with the present invention.

Once a device has obtained ownership of a shared resource (e.g., through the method of FIG. 2), it may need to update the semaphore to reflect changes in status. For example, the device must update the semaphore to relinquish ownership of the shared resource. Referring to FIG. 3, a method 300 for updating the semaphore first determines when a semaphore update is needed (step 302). A semaphore update is initiated (step 304), and the semaphore is updated by writing new data to the semaphore (step 306). At this point, if the shared resource is still required (step 308), the device has completed all it needs to do in updating the semaphore. However, if the shared resource is no longer required, the device clears the lock bit (step 310), which relinquishes ownership of the shared resource (step 312). Note that, if the device has determined that the shared resource is no longer needed, the data written to the semaphore (step 306) will indicate that the shared resource is not owned, but the lock bit in the spin buffer is still cleared (step 310) as a final step to complete the relinquishment of ownership of the shared resource.

Figure 4:
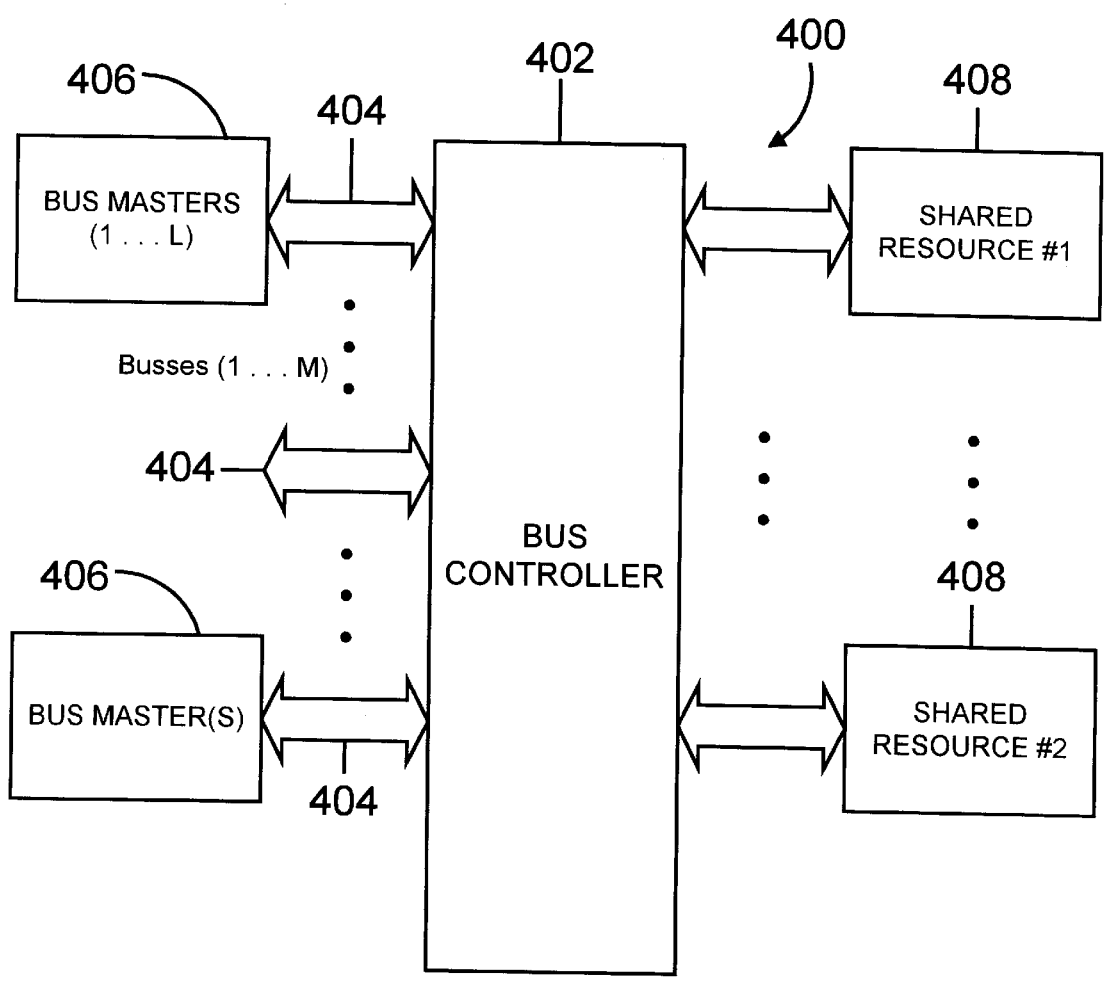
FIG. 4 is a block diagram of an exemplary system in accordance with the present invention.

Referring to FIG. 4, a circuit 400 in accordance with the present invention allows concurrent accesses to different semaphores by different devices, and comprises a bus controller 402, one or more busses 404, one or more bus masters 406 on each bus 404, and one or more shared resources 408. Bus controller 402 controls accesses by bus masters 406 to shared resources 408, allowing only one bus master 406 to have control or ownership of any given shared resource 408 at any given time. Bus masters 406 are suitable devices that need access to one or more shared resource 408, and which are capable of obtaining exclusive ownership of one or more shared resource 408. Shared resources 408 are resources, such as random access memory (RAM), that are shared between bus masters 406. Bus controller 402 may control accesses by bus masters 406 to shared resources 408 using any suitable scheme. For example, bus controller 402 may include arbitration logic which determines when to grant access to a shared resource 408 to a bus master 406. Bus controller 402 may thus assign bus masters 406 a priority which determines the order of granting their requests for shared resources 408. Bus masters 406 may request access to a shared resource 408, or in the alternative may be polled by bus controller 402 to determine whether access to a shared resource 408 is required. Whatever the implemented protocol, bus controller 402 assures data integrity in shared resources 408 and provides for concurrent accesses to different semaphores by different bus masters 406.

Figure 5:
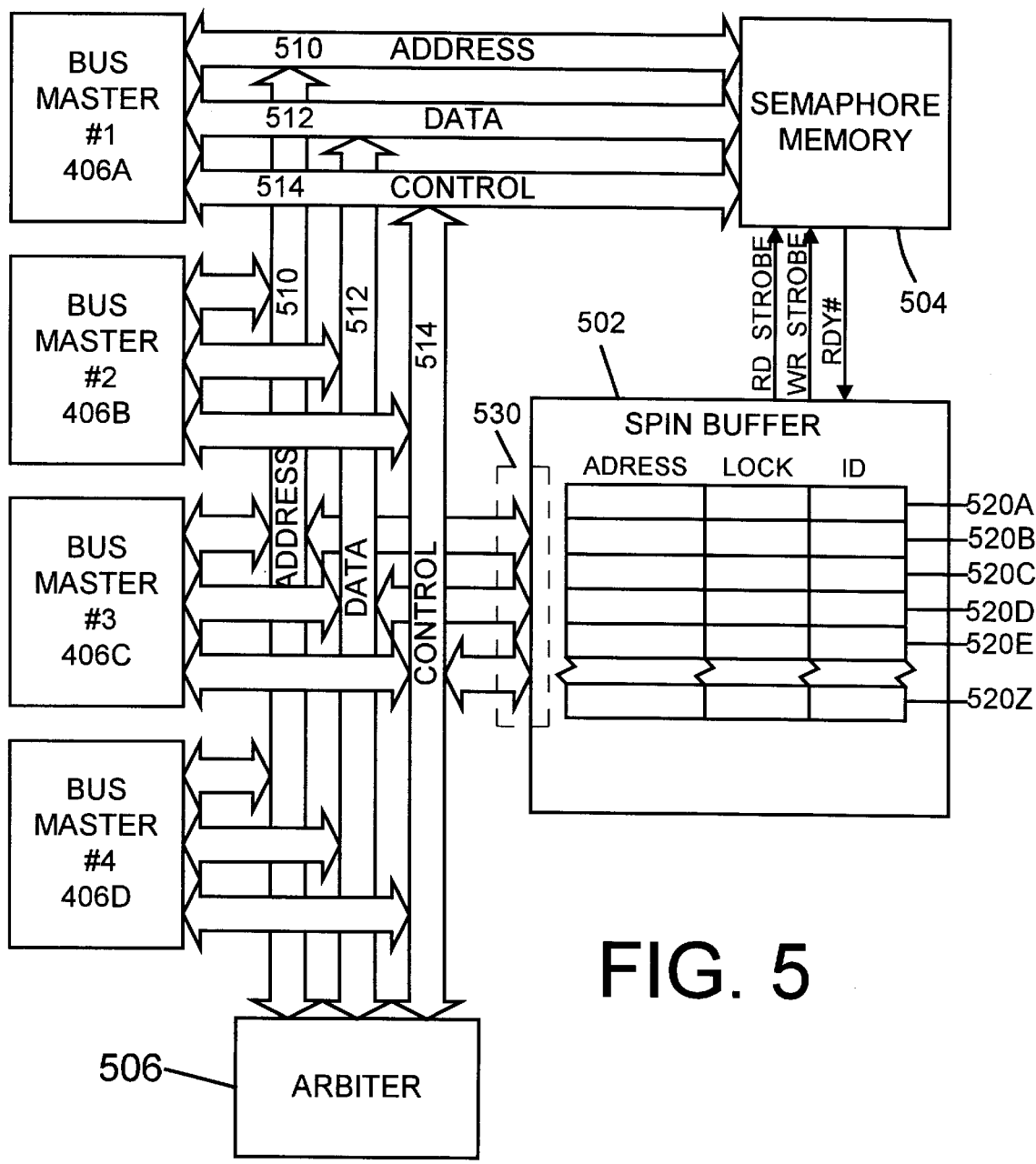
FIG. 5 is a block diagram of a first embodiment of the system of FIG. 4.

Referring to FIG. 5, one specific embodiment in accordance with the circuit of the present invention comprises four bus masters 406A-406D, a spin buffer 502, a semaphore memory 504, and an arbiter 506. An address bus 510, a data bus 512, and a control bus 514 interconnect each of bus masters 406A-406D, semaphore memory 504, spin buffer 502, and arbiter 506. In addition, control lines (i.e., RD_STROBE, WR_STROBE, and RDY#) interconnect semaphore memory 504 and spin buffer 502.

Spin buffer 502 includes a plurality of memory locations 520A-520Z, such as registers, with each location 520A–520Z adapted to hold data pertaining to one of the semaphores stored in semaphore memory 504. The data within memory locations 520A–520Z may include the address of the semaphore, whether or not the shared resource corresponding to the semaphore is locked or not (i.e., whether or not the shared resource is owned by another bus master), and the identification (ID) of the bus master 406A–406D that currently owns the resource.

Figure 8:
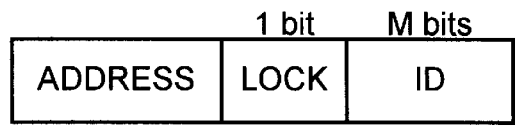
FIG. 8 is a schematic diagram of a first method of encoding ownership information in the spin buffer of the present invention.
Figure 9:
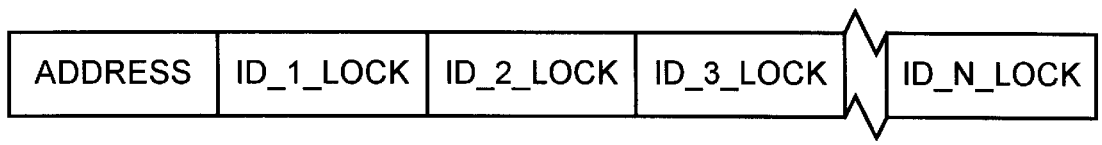
FIG. 9 is a schematic diagram of a second method of encoding ownership information in the spin buffer of the present invention.
Figure 10:
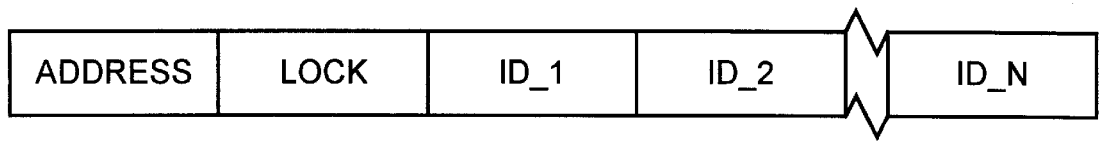
FIG. 10 is a schematic diagram of a third method of encoding ownership information in the spin buffer of the present invention.

Various methods may be employed to encode the ID and lock information within memory locations 520A–520Z, as shown in more detail in FIGS. 8–10. Referring to FIG. 8, a first method of encoding the lock and ID information uses a single lock bit, and a number M of bits sufficient to binarily encode each device that needs to access the shared resource with a unique ID. Thus, if there are eight devices in a system, three bits in the ID field would be required, with each of the eight binary combination corresponding to one of the devices. With this type of encoding scheme, the LOCK bit is set if the shared resource corresponding to the spin buffer location is owned by another device, and the binary encoding in the ID field indicates which device owns the shared resource. Referring to FIG. 9, an alternative scheme is known as "one hot" encoding. In this scheme, a separate lock bit is provided for each different device, and one of the lock bits are set if the corresponding device owns the shared resource. Referring to FIG. 10, yet another encoding scheme has a single lock bit, with a separate ID bit corresponding to each device that must share the shared resource. The methods shown in FIGS. 8–10 of encoding the lock and ID information of FIG. 5 are shown as examples of suitable encoding schemes, recognizing that many other schemes for representing the lock and ID information may be implemented within the scope of the present invention.

Referring again to FIGS. 2 and 5, when a device, such as bus master 406A, needs access to a shared resource (step 102), it initiates a read for ownership (step 202). When spin buffer 502 detects the read for ownership, it looks to see if the information corresponding to the semaphore for the shared resource is already within spin buffer 502. One way of determining whether spin buffer 502 contains the data is to look at the address fields of the memory locations 520. If the address of the semaphore is found within spin buffer 502, and another device does not own the corresponding shared resource, spin buffer 502 locks out all accesses to the semaphore by other devices (step 204), and writes to the lock bit/ID field of the memory location 520 (step 210) to indicate that the requesting device now owns the resource corresponding to the semaphore at that address. If the address of the semaphore is found within spin buffer 502 but is owned by another device, the requesting device must spin and retry later to gain access of the shared resource.

Figure 6:
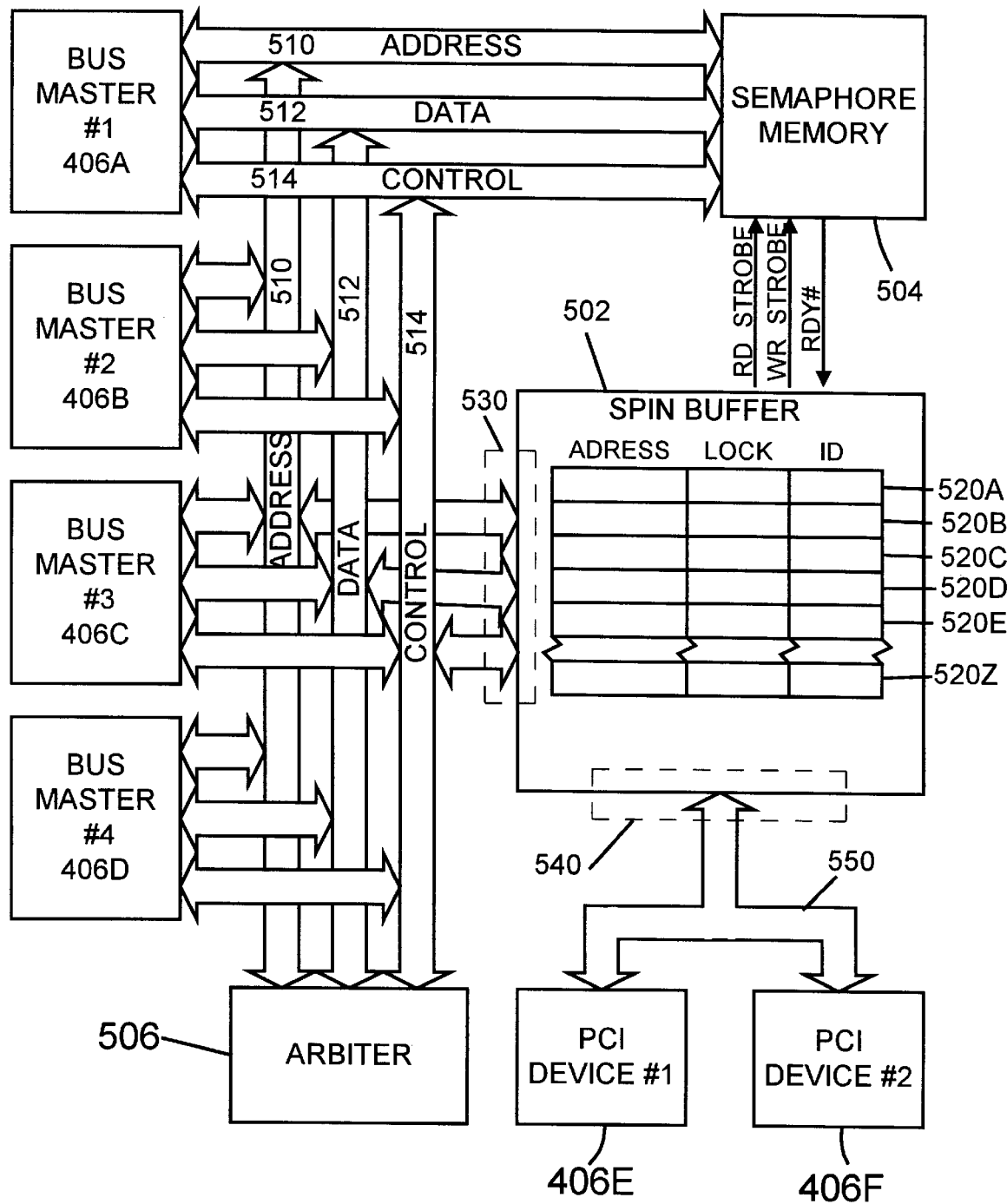
FIG. 6 is a block diagram of a second embodiment of the system of FIG. 4.

While the embodiment of FIG. 5 shows multiple bus masters 406A–D which access spin buffer 502 through a single bus connection or port 530, the embodiment of FIG. 6 shows a dual-port configuration. According to the second embodiment, bus masters 406A–D access spin buffer 502 through one port 530 to spin buffer 502, while PCI devices 406E and 406F access spin buffer 502 through a second port 540 via PCI bus 550. Spin buffer 502 performs the same basic function as before, but in addition it must discriminate between accesses on each of the two ports 530 and 540. Note that spin buffer 520 has the flexibility to discriminate between individual bus masters (e.g., 406A–406D), or in the alternative, may simply discriminate based on the port on which the device is connected. For example, in the circuit of FIG. 6, spin buffer 502 has a separate ID for each device 406A–406D on port 530, but has a single ID for port 540.

Thus, if either of devices 406E or 406F have ownership of a shared resource, the ID that is reflected in the ID field reflects that a device on port 540 has ownership, without distinguishing between the different devices coupled to port 540. Thus, bus master 406A–406D each have a dedicated ID, while bus masters 406E and 406F share an ID. The embodiment as shown in FIG. 6 illustrates that spin buffer 530 may discriminate between individual devices or between ports or between any combination of the two.

Figure 7:
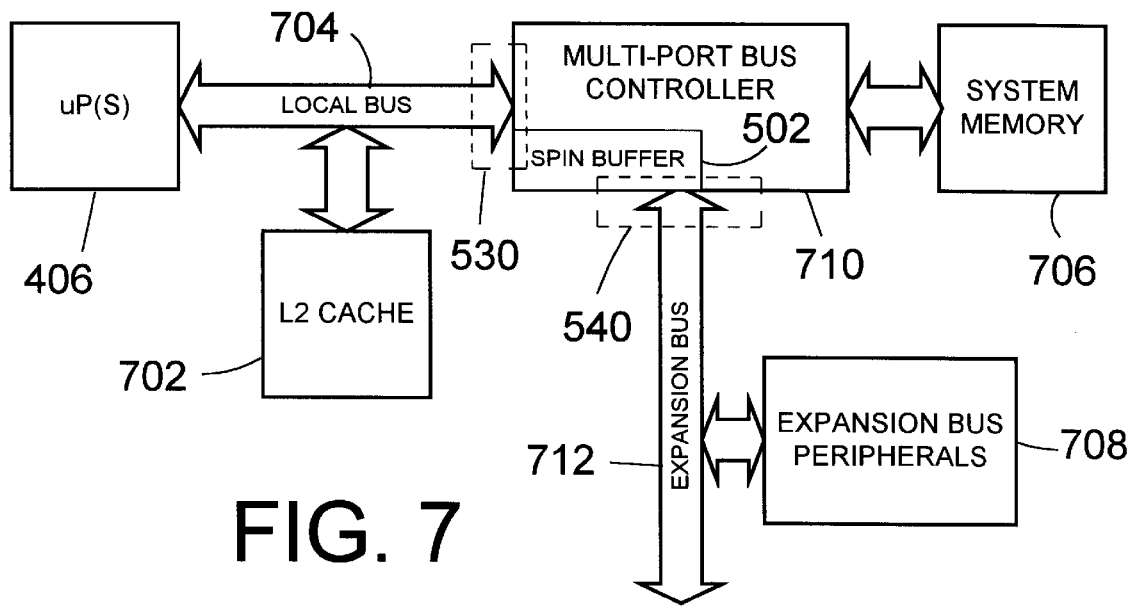
FIG. 7 is a block diagram of a third embodiment of the system of FIG. 4.

The configuration as shown in FIG. 6 is particularly applicable to a modern personal computer configuration, as illustrated in FIG. 7. In a computer system in accordance with the present invention, one or more microprocessors 406 are coupled to a local bus 704, which includes address, data and control lines (e.g., busses 510, 512 and 514 of FIG. 6). A second level (L2) cache 702 is coupled to local bus 704, which is, in turn, coupled to multi-port bus controller 710. Spin buffer 502 is contained within multi-port bus controller 710, and ports 530 and 540 on multi-port bus controller 710 correspond to ports 530 and 540 on spin buffer 502. Semaphore memory 504 of FIGS. 5 and 6 may be a separate memory within multi-port bus controller 710 (not shown), or may be a portion of system memory 706. Expansion bus peripherals 708 correspond to PCI devices 406E and 406F in FIG. 6, and are coupled to multi-port bus controller 710 via an expansion bus 712 (e.g., PCI bus 550) coupled to port 540. In the specific embodiment shown in FIG. 7, spin buffer 502 within multi-port bus controller 710 discriminates between each individual microprocessor 406 coupled to local bus 704, and between the group of expansion bus peripherals 708 coupled to port 540 via expansion bus 712. Spin buffer 502 in FIG. 7 thus achieves data integrity of share resources (e.g., system memory 706) while allowing simultaneous access to different semaphores, thereby increasing system performance.

Spin buffer 502 as illustrated in the figures and described herein provides for enhances system performance in at least two important ways. First, when a device is accessing one semaphore, spin buffer 502 allows concurrent accesses to other semaphores, as described above. A second important benefit of spin buffer 502 is the effective caching of semaphore lock information. As shown in FIG. 2, the lock bit is set (step 210) before reading the semaphore data (step 212) from semaphore memory. A subsequent access to the semaphore by a different device will find the address of the semaphore in spin buffer 502, and will determine from the lock and ID fields whether or not the shared resource is owned by another device. If the shared resource is currently owned by another device, the requesting device will know that it must spin based on the data cached in the spin buffer, without actually reading the semaphore from semaphore memory 504. Both of these advantages contribute to gains in system performance by using spin buffer 502.

While the invention has been particularly shown and described with reference to a preferred exemplary embodiment thereof, it will be understood by those skilled in the art that various changes in form and details may be made therein without departing from the spirit and scope of the invention. In addition, it will be understood that, while various of the conductors or connections are shown in the drawing as single lines, they are not so shown in a limiting sense, and may comprise plural conductors or connections, as is understood in the art.

We claim:

1. A buffer coupled to a semaphore memory for maintaining data integrity of resources shared by a plurality of devices in a computer system, the semaphore memory containing a plurality of semaphores corresponding to the shared resources, the buffer comprising:

a memory adapted to represent data from at least one of the plurality of semaphores stored in the semaphore memory, the memory comprising a lock and identification field adapted to identify whether the corresponding shared resource is owned by one of the plurality of devices and which of said plurality of devices owns the corresponding shared resource and an address field for relating the lock and identification means to a corresponding one of the plurality of semaphores; and means for allowing a first of said plurality of devices to access a first of said plurality of semaphores while preventing other of said plurality of devices from accessing said first of said plurality of semaphores and while allowing said other of said plurality of devices to access other of said plurality of semaphores.

2. The buffer of claim 1 wherein the lock and identification means collectively comprise a plurality of fields, the information in each of the plurality of fields indicating whether any of the plurality of devices has ownership of a shared resource corresponding to the semaphore corresponding to the lock and identification means.

3. A buffer, said buffer controlling access to a semaphore memory containing a plurality of semaphores to maintain data integrity of resources shared by a plurality of devices in a computer system, each semaphore corresponding to one of the plurality of shared resources, the buffer comprising:

a plurality of memory locations, each of the plurality of memory locations corresponding to one of the plurality of semaphores, each of the memory locations including:

an address field, said address field adapted to identify to which of the plurality of semaphores the memory location corresponds; and a lock and identification field, said lock and identification field adapted to identify which, if any, of the plurality of devices owns the shared resource corresponding to the semaphore which corresponds to the memory location;

a means for locking out accesses to the semaphore corresponding to the memory location by devices that do not own the corresponding shared resource according to the information contained in the lock and identification field; and a means for selectively allowing accesses to semaphores which are not locked according to the information contained in the lock and identification field of the plurality of memory locations.

4. A method for maintaining data integrity of resources shared by a plurality of devices in a computer system, comprising the steps of:

providing a semaphore memory containing a plurality of semaphores;

providing a buffer having a plurality of memory locations, each memory location corresponding to one of the plurality of semaphores, each memory location including lock and identification data and an address field;

allowing access by any of the plurality of devices to the semaphore corresponding to one of the address fields which corresponds to one of the memory locations if the lock and identification data indicate that no device has ownership of the shared resource corresponding to one of the address fields which corresponds to one the semaphore;

allowing access by one of the devices to the semaphore corresponding to one of the address fields which corresponds to one of the memory locations if the lock and identification data indicate that the one device has ownership of the shared resource corresponding to the one address field which corresponds to the one semaphore; and blocking access by a requesting device to the semaphore corresponding to the one address field which corresponds to the one memory location if the lock and identification data indicate that the requesting device does not own the shared resource and another of the plurality of devices owns the shared resource.

5. The method of claim 4 farther comprising the steps of:

identifying a shared resource which is needed by one of the plurality of devices;

identifying a selected one of the plurality of semaphores that correspond to the shared resource;

determining whether any of the memory locations within the buffer correspond to the selected semaphore;

if one of the memory locations within the buffer correspond to the selected semaphore, determining which of the devices owns the shared resource based on the lock and identification data;

if none of the memory locations within the buffer correspond to the selected semaphore, assigning one of the memory locations to the semaphore corresponding to the selected semaphore by writing the address of the semaphore to an address field in the assigned memory locations and by writing the lock and identification data to corresponding lock and identification fields in the assigned memory location.

* * * * *